United States Patent [19]

Uchinami

[11] Patent Number: 5,239,971
[45] Date of Patent: Aug. 31, 1993

[54] TROUBLE DIAGNOSIS DEVICE FOR EXHAUST GAS RECIRCULATION SYSTEM

[75] Inventor: Masanobu Uchinami, Hyogo, Japan
[73] Assignee: Mitsubishi Denki K.K., Tokyo, Japan
[21] Appl. No.: 911,579
[22] Filed: Jul. 10, 1992

[30] Foreign Application Priority Data

Aug. 3, 1991 [JP] Japan ................. 3-194570

[51] Int. Cl.$^5$ .............. F02M 25/07; F02D 41/14
[52] U.S. Cl. ................. 123/571; 123/676
[58] Field of Search ........... 123/568, 571, 676, 698

[56] References Cited

U.S. PATENT DOCUMENTS

| | | | |
|---|---|---|---|
| 4,462,376 | 7/1984 | Ripper et al. | 123/571 |
| 4,793,318 | 12/1988 | Tsurusaski | 123/571 |
| 4,794,903 | 1/1989 | Suzuki | 123/571 X |
| 4,834,054 | 5/1989 | Hashimoto et al. | 123/571 X |
| 4,870,942 | 10/1989 | Shibata et al. | 123/676 |

FOREIGN PATENT DOCUMENTS

| | | |
|---|---|---|
| 0029648 | 9/1979 | Japan . |
| 0159756 | 7/1987 | Japan ................. 123/571 |
| 0170750 | 7/1989 | Japan ................. 123/571 |
| 4-101054 | 4/1992 | Japan . |
| 4-101055 | 4/1992 | Japan . |

Primary Examiner—Willis R. Wolfe
Attorney, Agent, or Firm—Sughrue, Mion, Zinn, Macpeak & Seas

[57] ABSTRACT

This invention relates to a trouble diagnosis device for an exhaust gas recirculation (EGR) of an internal combustion engine. In the condition that an EGR control valve is turned on and off according to whether or not the operating condition of the engine is in the EGR control zone, and a trouble diagnosis condition is satisfied, sensors detect a plurality of engine operation conditions. A trouble diagnosis device receives the output detected by one of the sensors and compares the output with a predetermined value of the same kind as the output a normal state of the EGR system corresponding to the engine condition detected by the sensors, thereby the trouble of the EGR control system is diagnosed. Specifically, one of the sensors detects $NO_x$ in exhaust gas or exhaust gas temperature.

7 Claims, 6 Drawing Sheets

TROUBLE DIAGNOSIS DEVICE FOR EXHAUST GAS RECIRCULATION SYSTEM

BACKGROUND OF THE INVENTION

This invention relates to a trouble diagnosis device which is able to detect whether or not an EGR (exhaust gas recirculation or return) system for controlling the EGR in the engine is out of order.

A trouble diagnosis device for EGR system has been well known in the art which electronically controls the operation of an EGR control valve provided in an EGR path through which part of the exhaust ga is recirculated being returned from an exhaust passageway to an intake passageway, thereby to control the amount of EGR. The EGR system controls an electromagnetic valve according to the speed and load of the engine (for instance an intake pipe pressure or a Q/N ratio where Q is the amount of air sucked, and N is the number of revolutions) for control of the amount of EGR.

A conventional EGR trouble diagnosis device of this type is as shown in FIG. 7. In FIG. 7, a conventional internal combustion engine 1 of 4-cycle spark ignition type is mounted on a motor vehicle. An intake pipe 3 is connected to the engine 1, thus forming an intake passageway for taking air through an air cleaner 2. The intake pipe 3 incorporates a throttle valve 4 in its upstream portion. The throttle valve 4 is to adjust the amount of air taken into the internal combustion engine 1. Furthermore, the intake pipe 3 has an electromagnetic injection valve 5 at a downstream position closed to the junction of the intake pipe 3 and the engine 1. The injection valve 5 is to jet fuel from a fuel system (not shown) into the engine. A pressure sensor 6 and a throttle sensor 7 are provided downstream of the throttle valve 4. The pressure sensor 6 operates to detect the absolute pressure in the intake pipe 3 and to convert it into a voltage signal. The throttle sensor 7 operates to detect the degree of opening of the throttle valve 4, to output a voltage corresponding to the degree of opening thus detected. The outputs of the pressure sensor 6 and the throttle sensor 7 together with the outputs of a crank angle sensor (not shown) and a cooling water temperature sensor (not shown) are applied to an electronic control section 8. The electronic control section 8, with those outputs as input data, controls the electromagnetic injection valve 5, and controls an electromagnetic valve 9, thereby to control the EGR (exhaust gas recirculation).

An EGR control device comprises: an exhaust branch pipe 11 which is connected to an exhaust pipe 10 to receive part of the exhaust gas from an exhaust passageway formed by the exhaust pipe 10; an EGR control valve 12 provided in an EGR passageway formed by the exhaust branch pipe 11; and an EGR inlet pipe 13 through which the downstream portion of the EGR control valve 12 is communicated with an intake passageway in the intake pipe 3 which is located downstream of the throttle valve 4. The EGR control valve 12 comprises: a negative pressure chamber 12A; a valve body 12B of diaphragm type which is opened by the negative pressure in the negative pressure chamber 12A; and a spring 12C urging the valve body 12B to close the control valve. The negative pressure chamber 12A of the EGR control valve 12 is connected through the electromagnetic valve 9 to a control negative pressure pipe 14 which is connected to the intake passageway at a position close to the throttle valve 4 downstream of the latter 4. The electromagnetic valve 9 has an air open valve 15. That is, the electromagnetic valve 9 is so designed that, when it is at a close control position, the air open valve 15 is closed to couple the negative pressure chamber 12A to the control negative pressure pipe 14, and when it is at an open control position, the negative pressure chamber 12A is opened to the air. When the negative pressure chamber 12A of the EGR control valved 12 is coupled to the control negative pressure pipe 14 by means of the electromagnetic valve 9 set to the close control position, the opening degree of the valve body 12 is changed by the negative pressure in the negative pressure chamber 12A, so that the amount of exhaust gas returned from the exhaust pipe 10 through the valve body 12B and the EGR inlet pipe 13 into the internal combustion engine 1 is controlled.

In the electronic control device for EGR system thus organized, the electronic control section 8 utilizes the outputs of the pressure sensor 6, the throttle sensor 7, the crank angle sensor, and the cooling water temperature sensor as input data, in which the control section 8 controls the operation of the electromagnetic injection valve 5 to inject the most suitable amount of fuel for purification of exhaust gas, and detects a control zone for EGR, and controls the operation of the electromagnetic valve 9 so that the operation of the internal combustion engine may not be adversely affected, thereby to control the operation of the EGR control valve 12. That is, when the EGR operation is required, the electronic control section 8 outputs a control signal to close the electro-magnetic valve 9 which has been opened to the air, as a result of which the negative pressure chamber 12A of the EGR control valve 12 is coupled to the control negative pressure pipe 14. The negative pressure downstream of the throttle valve 4 is applied to the negative pressure chamber 12A, so that the balance of the negative pressure with the elastic force of the spring 12C of the EGR control valve 12 determines the amount of lift of the valve body 12B, and the exhaust gas is returned at a flow rate corresponding to the amount of lift thus determined. When the EGR operation is not required, the electronic control section 8 outputs a control signal to set the electromagnetic valve 9 to the closed position. As a result, the negative pressure chamber 12A is opened through the air open valve 15 to the air, and the valve body 12B is fully closed, thus stopping the recirculation of the exhaust gas.

The conventional EGR system is designed as described above. This system has only simple means for detecting faults with high accuracy such that the EGR control system becomes out of order or unsatisfactory in operation, or that the valves and/or pipes are clogged up by contamination to make it impossible to recirculate a predetermined amount of exhaust gas with the result that the exhaust gas becomes worse in quality.

SUMMARY OF THE INVENTION

Accordingly, an object of this invention is to eliminate the above-described problem accompanying a conventional EGR system.

More specifically, an object of the invention is to provide a trouble diagnosis device for an EGR system which is low in manufacturing cost and is able to diagnosis whether or not the EGR control device is out of order.

The foregoing object of the invention has been achieved by the provision of a trouble diagnosis device for exhaust gas recirculation or return (EGR) system of an internal combustion engine including an exhaust gas recirculation passageway which is partially returned exhaust gas from an exhaust passageway to an intake passageway, and an EGR control valve for controlling the flow rate of said returned exhaust gas, said trouble diagnosis device comprising: sensors for detecting a plurality of engine operation conditions; trouble diagnosis means for receiving the outputs thus detected of said sensors, and comparing said outputs with predetermined values in normal state of said EGR system corresponding to the engine conditions detected by said sensors, respectively, thereby the trouble of said EGR control system is diagnosed.

The further includes an $NO_x$ sensor for detecting an amount of $NO_x$ in the exhaust gas which is provided in the exhaust passageway; and trouble diagnosis means for receiving the outputs of the $NO_x$ sensor provided respectively when the EGR control valve is in operation and not in operation, and comparing the outputs thus detected with predetermined values, to diagnosis whether or not the EGR control device is out of order.

In the trouble diagnosis device, instead of the $NO_x$ sensor, an exhaust gas temperature sensor may be employed. In this case, the outputs of the exhaust gas temperature sensor detected respectively when the EGR control valve is in operation and not in operation are subjected to comparison, to diagnosis whether or not the EGR control device is out of order.

If the EGR control device is operating normally, the amount of $NO_x$ in the exhaust gas which is detected during the operation of the EGR control valve is smaller than during the non-operation of the EGR control valve; and the exhaust gas temperature which is detected during the operation of the EGR control valve is lower than during the non-operation of the EGR control valve. Therefore, the trouble of the EGR control device can be diagnosed by comparison of the outputs of the $NO_x$ sensor, or by comparison of the exhaust gas temperatures.

The nature, principle, and utility of the invention will be more clearly understood from the following detailed description of the invention when read in conjunction with the accompanying drawings.

DETAILED DESCRIPTION OF THE INVENTION

Preferred embodiments of this invention will be described with reference to the accompanying drawings.

Figure 1:
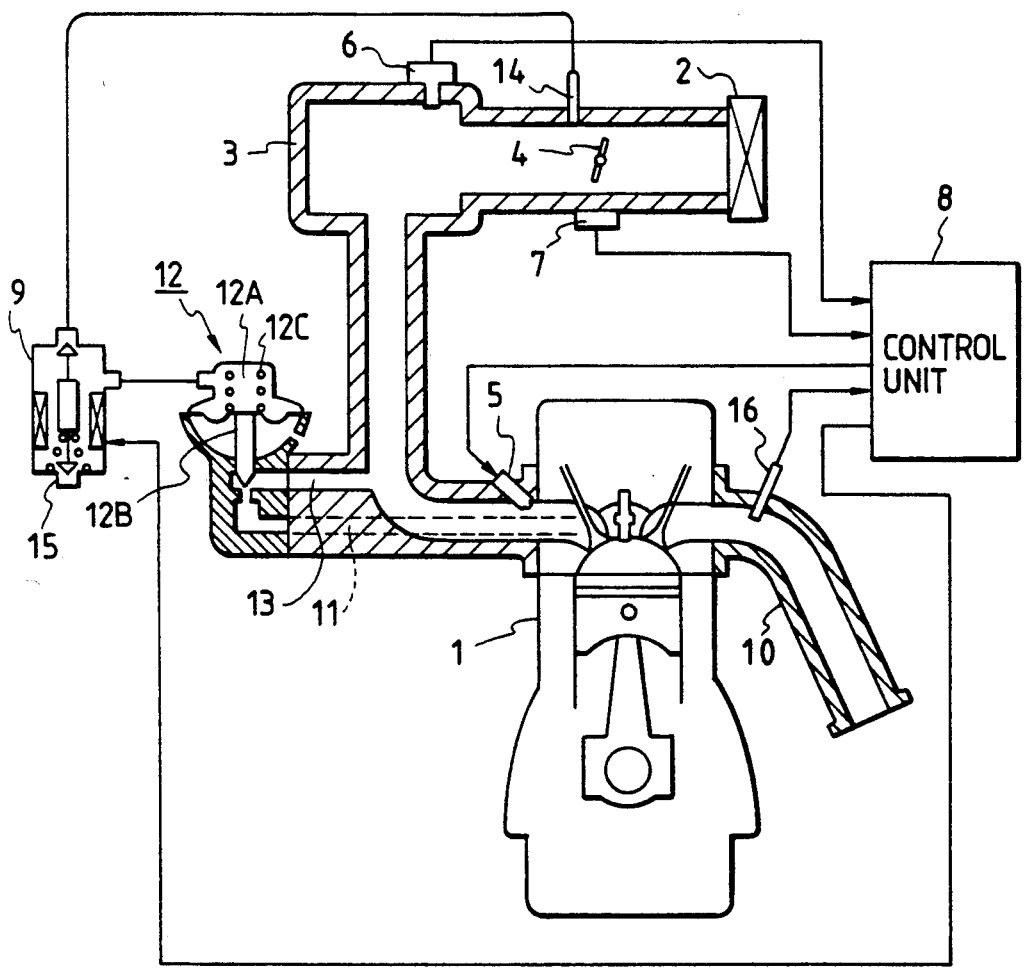
FIG. 1 is an explanatory diagram showing the whole arrangement of a first example of an EGR system for an internal combustion engine according to the invention.
Figure 7:
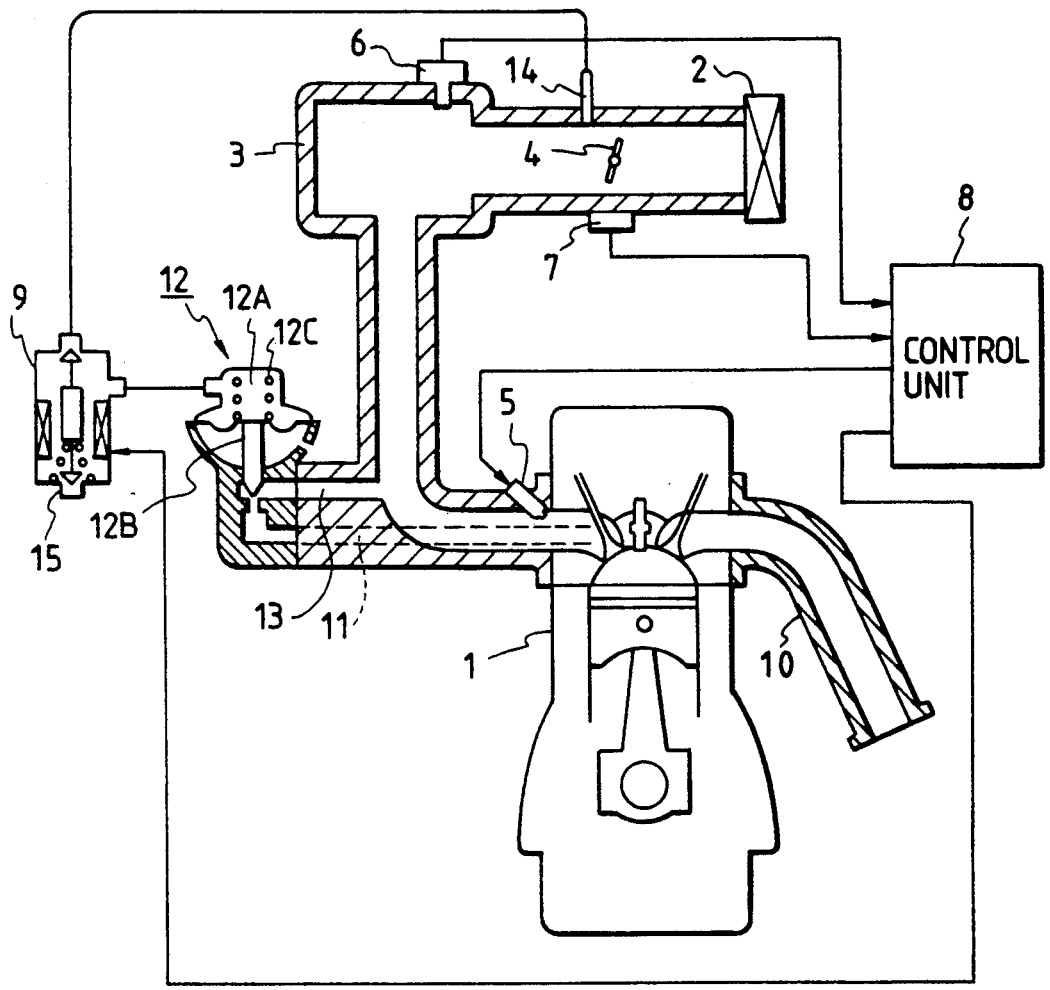
FIG. 7 is an explanatory diagram showing the arrangement of a conventional EGR system for an internal combustion engine.

A first example of an electronic control device for EGR system according to the invention is as shown in FIG. 1. Each element having same function with the conventional device shown in FIG. 7 is designated with same reference, and the explanation thereof is omitted. Therefore, the electronic control device will be described with respect mainly to its parts which are not included in the conventional device.

In the electronic control device, as shown in FIG. 1, the exhaust pipe 10 has an $NO_x$ sensor 16 for detecting an amount of $NO_x$ in the exhaust gas. The $NO_x$ sensor 16 may be a conventional one which changes its electrical resistance with the amounts of $NO_2$ and NO in the exhaust gas as disclosed by the literature "Automobile Technique", vol. 39, No. 2, 1985, p. 197.

Figure 2:
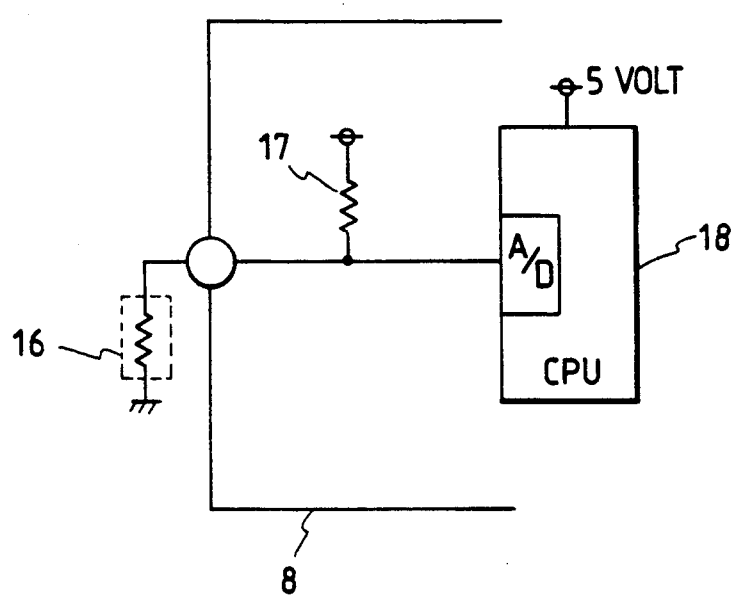
FIG. 2 is a circuit diagram, partly as a block diagram, showing an signal interface circuit of an $NO_x$ sensor in the first example of the trouble diagnosis device shown in FIG. 1.

FIG. 2 shows the signal interface circuit of the $NO_x$ sensor 16 in the electronic control section 8. In FIG. 2, a resistor 17 and a micro computer 18 including an analog-to-digital (A/D) converter are provided. The electronic control section 8 further comprises a ROM and a RAM. Thus, the output of the $NO_x$ sensor 16 is stored as a voltage signal, from which the amount of $NO_x$ is detected.

Figure 3:
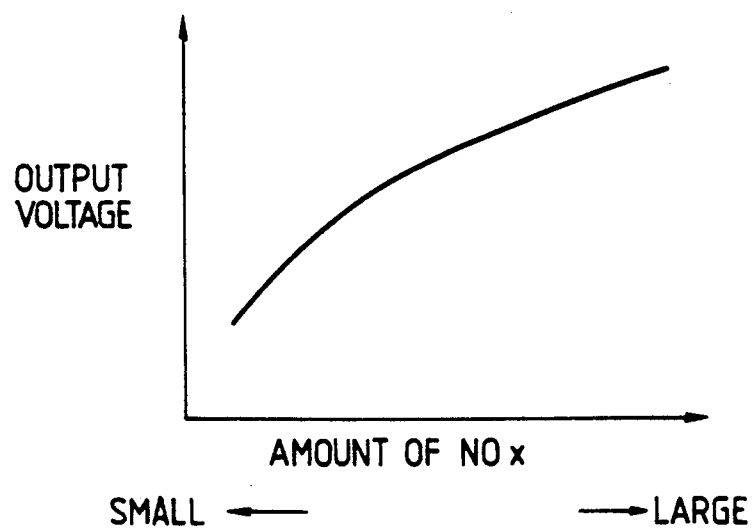
FIG. 3 is a characteristic diagram indicating amounts (densities) of $NO_x$ detected by the $NO_x$ sensor with output voltages.

FIG. 3 indicates amounts (densities) of $NO_x$ detected by the $NO_x$ sensor 16 with output voltages corresponding thereto.

Figure 4:
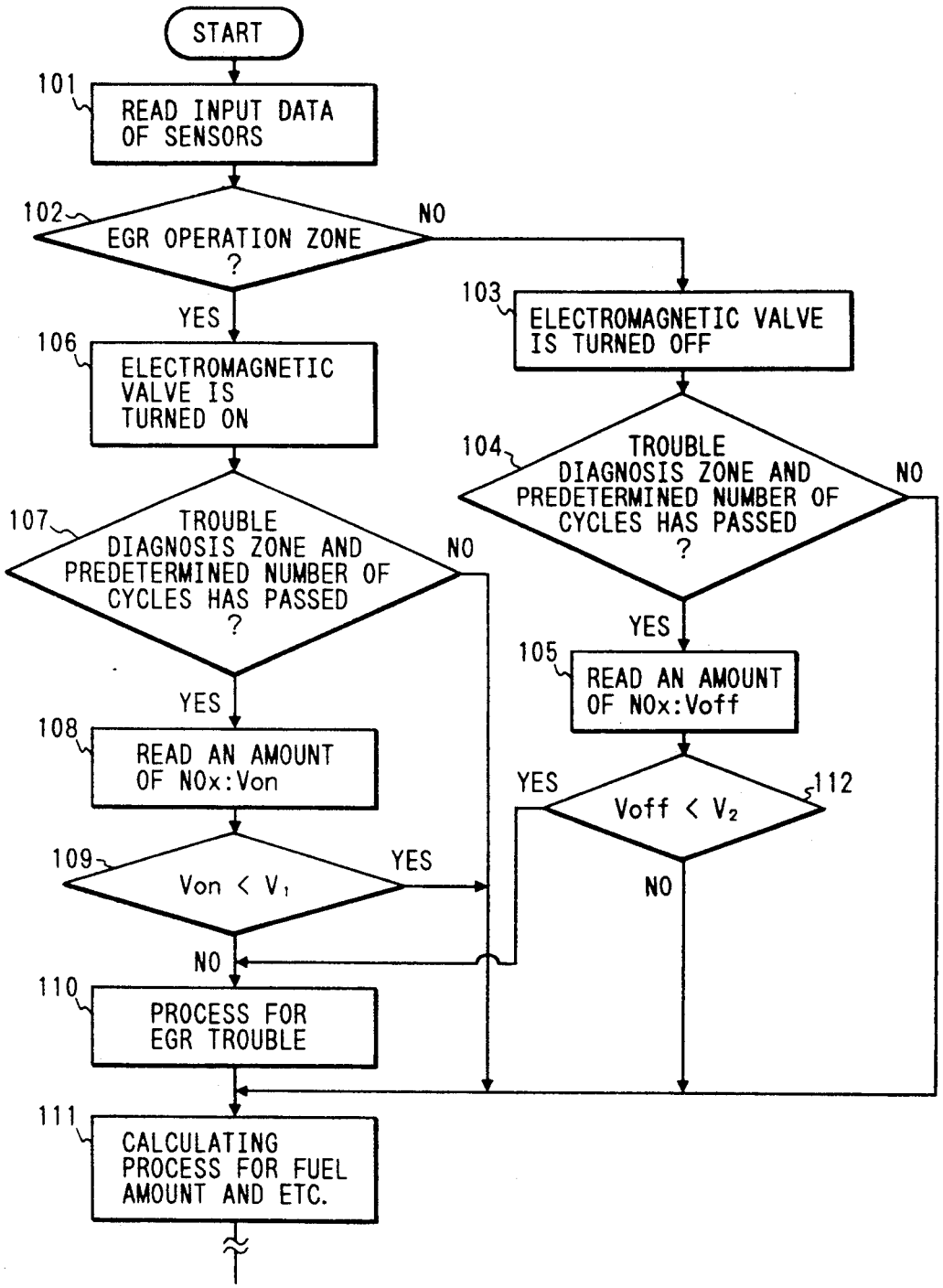
FIG. 4 is a flow chart for a description of the operation of the first example of the trouble diagnosis device according to the invention.

Now, the characteristic operation of the electronic control device thus organized will be described with reference to a flow chart of FIG. 4. The flow of operations shown in FIG. 4 has been stored, as a program, in the aforementioned ROM.

First, in Step 101, the output signals of the crank angle sensor (not shown), the pressure sensor 6, the throttle sensor 7, and the cooling water temperature sensor (not shown) are utilized to read input data such as engine speed, intake pipe pressure, throttle valve opening, and water temperature.

Next, in Step 102, it is detected whether or not the above-described various data is within a predetermined EGR operation zone; that is, it is detected whether or not the operating condition is within a zone that needs EGR (exhaust gas recirculation). When the result is that the data is not within the EGR operation zone, Step 103 in which the electromagnetic valve 9 is turned off (opened) is effected, so that the EGR is not effected. Thereafter, in Step 104, it is detected whether or not the data is within a trouble diagnosis zone. Further in this step 104, for taking into account the response time of the $NO_x$ sensor 16, it is detected whether or not the amount of $NO_x$ in the exhaust gas has become stationary, according to whether a predetermined number of cycles (for instance 100 cycles) of the engine have passed or not after the electromagnetic valve 9 has been turned off. The operation range of the aforementioned trouble diagnosis zone is the low load range of the engine in which the operation of the engine is in a stationary state, and the difference of the amount of $NO_x$ between EGR on operation and off operation states appears obviously.

If, in Step 104, the data is not within the trouble diagnosis zone, or the predetermined number of cycles of the engine has not passed yet after the electromagnetic valve 9 has been turned off, then Step 111 (described later) is effected. On the other hand, when the data is in the trouble diagnosis zone, and the predetermined number of cycles of the engine has passed after the electromagnetic valve 9 has been turned off, then Step 105 is effected. In Step 105, the amount of $NO_x$ in the exhaust gas which is detected in the non-operation of the EGR is read into the control section 8 as a voltage signal $V_{OFF}$.

Thereafter, in Step 112, the voltage signal $V_{OFF}$ is compared with a predetermined value $V_2$. (The value $V_2$ is defined as an estimated voltage signal on the same engine operation condition as the voltage signal $V_{OFF}$.) In the case where the EGR device is subjected to the normal turn off condition, the amount of $NO_x$ in the exhaust gas cannot be smaller than the value $V_2$ predetermined through experiments. Thus, the trouble diagnosis can be performed from the above-described comparison.

When, in Step 112, a result of the diagnosis is that the EGR device is subjected to the normal turned off condition corresponding to the result as $V_{OFF} \geq V_2$, then Step 111 is effected.

When, on the other hand, the result of the diagnosis is that the EGR device is out of order corresponding to the result as $V_{OFF} < V_2$, Step 110 is effected. In Step 110, an EGR trouble process is carried out which includes an EGR fail-safe operation, an alarm signal producing operation, and so forth.

On the other hand, in Step 102, when the result of the diagnosis is that the data is within the EGR operation zone, then in Step 106, the electromagnetic valve 9 is turned on (closed) so as to permit the execution of EGR (exhaust gas recirculation). Thereafter, in Step 107, similarly as in Step 104, it is detected whether or not the data is within the trouble diagnosis zone, and it is also detected whether the predetermined number of cycles has passed or not after the electromagnetic valve was operated. If, in this case, the data is not within the trouble diagnosis zone, or the predetermined number of cycles has not passed after the electromagnetic valve was operated, then Step 111 is effected. On the other hand, if the data is within the trouble diagnosis zone, and the predetermined number of cycles has passed after the electromagnetic valve was operated, then Step 108 is effected. In Step 108, the amount of $NO_x$ in the exhaust gas detected when the EGR is effected, is read as a voltage signal $V_{ON}$.

Next, in Step 109, the voltage signal $V_{ON}$ is compared with a value $V_1$ predetermined through experiments. (The value $V_1$ is defined as an estimated voltage signal on the same engine operation condition as the voltage signal $V_{ON}$.) When the EGR device is operating normally, the exhaust gas is led into the intake passageway to decrease the temperature of combustion, thereby to reduce the amount of $NO_x$ in the exhaust gas. Hence, the trouble of the EGR device can be diagnosed from the comparison of $V_{ON}$ with $V_1$.

When, in Step 109, the result of the diagnosis is that the EGR device is operating normally corresponding to the result as $V_{ON} < V_1$, Step 111 is effected.

When the result of the diagnosis is that the EGR device is out of order corresponding to the result that $V_{ON} < V_1$ is not satisfied, then Step 110 is effected. In Step 110, the aforementioned EGR trouble treating process is carried out.

In Step 111, a fuel injection control process and other processes for the engine are performed.

Figure 5:
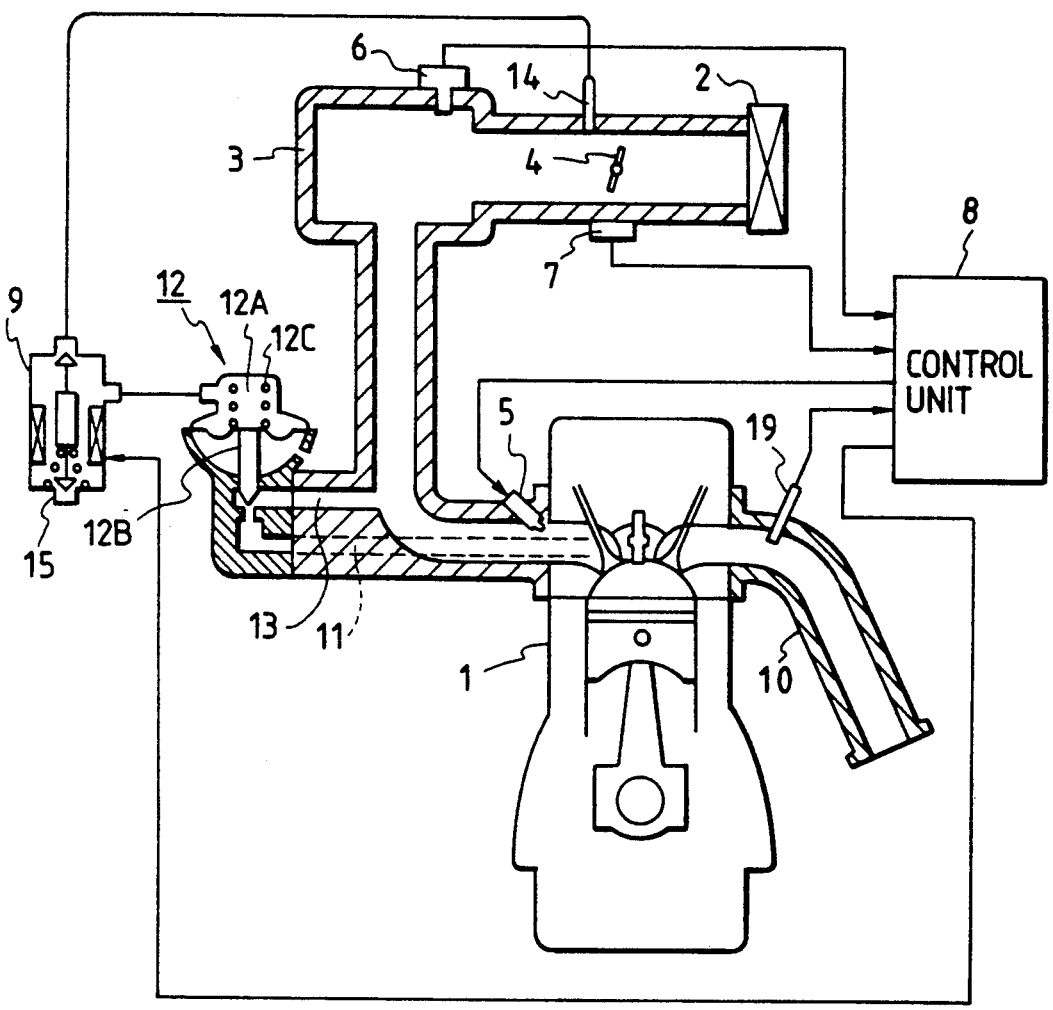
FIG. 5 is an explanatory diagram showing the whole arrangement of a second example of the trouble diagnosis device according to the invention.

FIG. 5 shows the arrangement of a second example of the electronic control device according to the invention. Each element having the same function with the conventional device shown in FIG. 7 is designated with the same reference numeral, and the explanation thereof is omitted. Therefore, the electronic control device will be described with respect mainly to its parts which are not included in the conventional device.

In the electronic control device, as shown in FIG. 5, an exhaust gas temperature sensor is mounted on the exhaust pipe 10, to detect a temperature of exhaust gas. The exhaust gas temperature sensor may be a conventional one which is made up of a thermocouple and is able to measure sufficiently high temperatures. The electronic control section 8 is equal in arrangement to the one in the above-described first example of the electronic control device.

Figure 6:
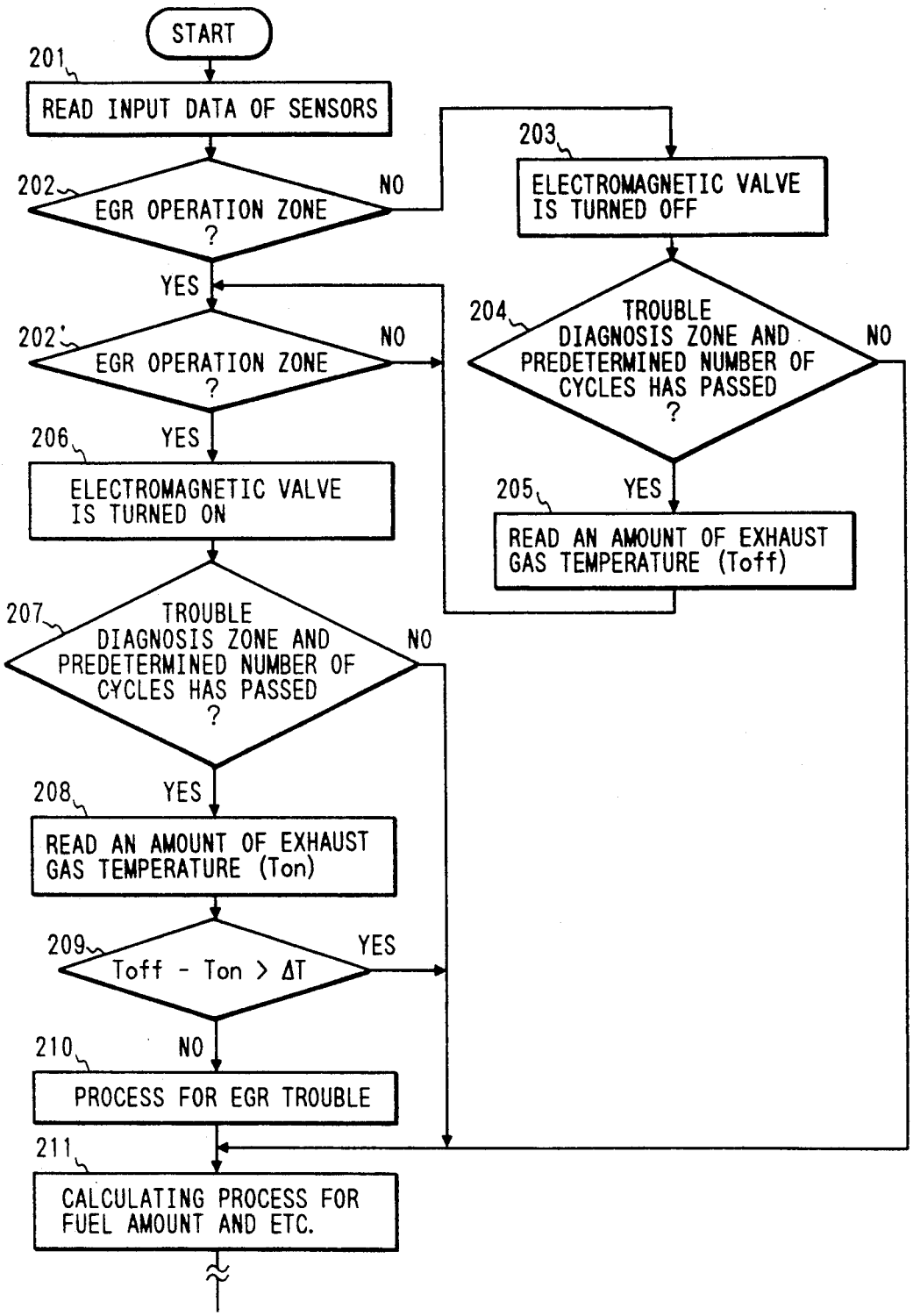
FIG. 6 is a flow chart for a description of the operation of the second example of the trouble diagnosis device according to the invention.

The characteristic operation of the electronic control device shown in FIG. 5 will be described with reference to a flow chart of FIG. 6. In the electronic control device, too, the flow of operations indicated in FIG. 6 has been stored, as a program, in the ROM.

First, in Step 201, the output signals of the crank angle sensor (not shown), the pressure sensor 6, the throttle sensor 7, and the cooling water temperature sensor (not shown) are utilized to read input data such as engine speed, intake pipe pressure, throttle valve opening, and water temperature.

Next, in Step 202, it is detected whether or not the above-described various data is within a predetermined EGR control zone; that is, it is detected whether or not the operating condition is within a zone that needs EGR. When the data is not within the EGR control zone, Step 203 is effected. In Step 103, the electromagnetic valve 9 is turned off (opened), so that the EGR is not effected. Thereafter, in Step 204, it is detected whether or not the data is within a trouble diagnosis zone, further, for taking into account the response time of the exhaust gas temperature sensor 16, it is detected whether or not the exhaust gas temperature has become sufficiently stable according to whether or not a predetermined number of cycles (for instance 100 cycles) of the engine have passed after the electromagnetic valve 9 has been turned off. The operation range of the aforementioned trouble diagnosis zone is the low load range of the engine in which the operation of the engine is in the stationary state, and the difference of the temperature of exhaust gas between an EGR on operation or an EGR off operation appears obviously.

When, in Step 204, it is detected that the data is not within the trouble diagnosis zone, or the predetermined number of cycles of the engine has not passed yet after the electromagnetic valve 9 has been turned off, then Step 211 (described later) is effected. On the other hand, when the data is within the trouble diagnosis zone, and the predetermined number of cycles of the engine has passed after the electromagnetic valve 9 has been turned off, then Step 205 is effected. In Step 205, the exhaust gas temperature $T_{OFF}$ detected when the EGR is not effected, is read. Then Step 202' which detects that the data is within the EGR control zone is effected.

On the other hand, when, in Step 202, it is detected that the data is within the EGR control zone, through Step 202', in Step 206 the electromagnetic valve 9 is turned on (closed) so as to permit the execution of EGR (exhaust gas recirculation). Thereafter, in Step 207, similarly as in Step 204, it is detected whether or not the data is within the trouble diagnosis zone, and it is also detected whether or not the predetermined number of cycles has passed after the electromagnetic valve has been operated. If, in this case, the data is not within the trouble diagnosis zone, or the predetermined number of cycles has not passed after the electromagnetic valve has been operated, then Step 211 is effected. On the other hand, if the data is within the trouble diagnosis zone, and the predetermined number of cycles has passed after the electromagnetic valve has been operated, then Step 208 is effected. In Step 208, the exhaust gas temperature $T_{ON}$ detected when the EGR is effected, is read.

Next, in Step 209, the exhaust gas temperature difference $T_{ON} - T_{OFF}$ between EGR on and off conditions is estimated, in which the engine conditions are that in which the data is within the trouble diagnosis zone and that the exhaust gas temperature is stable. When the EGR device is operating normally, the exhaust gas is led into the intake passageway. As a result of which, with the operating conditions maintained unchanged, the state of combustion becomes worse than in the case where the EGR is not effected, and the exhaust gas temperature is decreased. Hence, it can be diagnosed from the comparison of $(T_{OFF} - T_{ON})$ with a value $\Delta T$ (for instance 50° C.) whether or not the EGR device is out of order.

When, in Step 209, it is detected that the EGR device is operating normally corresponding to $(T_{OFF} - T_{ON}) > \Delta T$, Step 211 is effected. When it is detected that the EGR device is out of order corresponding to $(T_{OFF} - T_{ON}) > \Delta T$ is not satisfied, then Step 210 is effected. In Step 210, the aforementioned EGR trouble handling process is carried out.

In Step 211, a fuel injection control process and other processes for the engine are performed.

In the above-described electronic control devices of the invention, one trouble diagnosis zone is employed to detect whether or not the EGR device is out of order; however, the invention is not limited thereto or thereby. That is, the trouble diagnosis zone may be provided into a plurality of zones for further fine diagnosis. In this case, with respect to each of the plurality of zones, the trouble diagnosis is performed from the amount of $NO_x$ or the difference of the exhaust gas temperatures between EGR operation being on and off.

A few preferred embodiments of the invention have been described with reference to the engine in which the amount of air taken is detected from the pressure in the intake pipe thereby to control the fuel injecting operation; however, the invention is not limited thereto or thereby. That is, the technical concept of the invention can be applied to an engine, too, in which the amount of air taken is detected with an air flow sensor, with a $NO_x$ sensor or an exhaust gas temperature sensor connected to the engine.

As was described above, in the electronic control device of the invention, whether or not the EGR device is out of order is detected from the amounts of $NO_x$ in the exhaust gas detected respectively when the EGR control valve is in operation and not in operation, or the difference between exhaust gas temperatures detected respectively when the EGR control valve is in operation and not in operation. Hence, the electronic control device of the invention is low in manufacturing cost, and is yet able to detect with high accuracy whether or not the EGR device is out of order.

While there has been described preferred embodiments of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A trouble diagnosis device for an exhaust gas recirculation (EGR) system of an internal combustion engine including an exhaust gas recirculation passageway for returning a portion of exhaust gas from an exhaust passageway to an intake passageway, and an exhaust gas recirculation control valve for controlling the flow rate of returned exhaust gas, said trouble diagnosis device comprising:

a plurality of sensors for detecting a plurality of engine operation conditions;

trouble diagnosis means for receiving outputs of said sensors, and comparing said outputs with predetermined values representing a normal state of said EGR system corresponding to the engine operation conditions detected by said sensors, respectively, thereby to diagnose trouble in said EGR system, said trouble diagnosis means including means for detecting whether said engine operation corresponding to said outputs of said sensors is within a predetermined trouble diagnosis zone, said predetermined trouble diagnosis zone being a low load range of said engine.

2. A trouble diagnosis device according to claim 1, wherein said plurality of sensors include a $NO_x$ sensor which is provided in said exhaust passageway for detecting an amount of $NO_x$ in exhaust gas in said exhaust passageway.

3. A trouble diagnosis device according to claim 2, wherein said trouble diagnosis means includes means for detecting whether said EGR control valve can be operated during an operation of said engine corresponding to said outputs of said sensors;

means for calculating values of the amount of $NO_x$ when said EGR control valve is in operation and not in operation, respectively, and when said engine operation is within said predetermined trouble diagnosis zone, as a predetermined value of the amount of $NO_x$ of said engine operation; and means for comparing said values of an amount of $NO_x$ detected by said $NO_x$ sensor with said values of an amount of $NO_x$ calculated by said calculating means when said EGR control valve is in operation and not in operation, respectively.

4. A trouble diagnosis device according to claim 1, wherein said plurality of sensor includes an exhaust gas temperature sensor for detecting temperatures of exhaust gas which is provided in said exhaust passageway.

5. A trouble diagnosis device according to claim 4, wherein said trouble diagnosis means includes means for detecting whether said EGR control valve can be operating during an operation of said engine corresponding to said outputs of said sensors; and means for comparing said temperatures of exhaust gas when said EGR control valve is in operation and not in operation, when said engine operation is within said predetermined trouble diagnosis zone.

6. A trouble diagnosis device according to claim 5, wherein said trouble diagnosis means includes calculating means, when said engine operation is within said predetermined trouble diagnosis zone, for calculating a difference between the temperatures when said EGR control valve is in operation and not in operation, as said predetermined value of temperature of said exhaust gas, and for calculating a difference between the temperatures detected by said exhaust gas temperature sensor when said EGR control valve is in operation and not in operation, whereby said comparing means compares said difference calculated as said predetermined value with said difference calculated between the detected temperatures by said exhaust gas temperature sensor.

7. A trouble diagnosis device for an exhaust gas recirculation (EGR) system of an internal combustion engine including an exhaust gas recirculation passageway for returning a portion of exhaust gas from an exhaust passageway to an intake passageway, and an exhaust gas recirculation control valve for controlling the flow rate of returned exhaust gas, said trouble diagnosis device comprising:

a plurality of sensors for detecting a plurality of engine operation conditions, said plurality of sensors including a $NO_x$ sensor positioned in said exhaust passageway for detecting an amount of $NO_x$ in exhaust gas in said exhaust passageway; and trouble diagnosis means for receiving outputs of said sensors, and comparing said outputs with predetermined values representing a normal state of said EGR system corresponding to the engine operation conditions detected by said sensors, respectively, thereby to diagnose trouble in said EGR system, said trouble diagnosis means including:

means for detecting whether said engine operation corresponding to said outputs of said sensors is within a predetermined trouble diagnosis zone, said predetermined trouble diagnosis zone being a low load range of said engine;

means for detecting whether said EGR control valve can be operated during an operation of said engine corresponding to said outputs of said sensors;

means for calculating values of an amount of $NO_x$ when said EGR control valve is in operation and not in operation, respectively, and when said engine operation is within said predetermined trouble diagnosis zone, as a predetermined value of the amount of $NO_x$ of said engine operation; and means for comparing said values of an amount of $NO_x$ detected by said $NO_x$ sensor with said values of an amount of $NO_x$ calculated by said calculating means when said EGR control valve is in operation and not in operation, respectively, wherein an amount of $NO_x$ detected by said $NO_x$ sensor when said EGR control valve is in operation is less than an amount of $NO_x$ detected when said EGR control valve is not in operation.

* * * * *